United States Patent [19]
Takasi et al.

[11] Patent Number: 4,890,460
[45] Date of Patent: Jan. 2, 1990

[54] AIR CONDITIONING APPARATUS FOR CAR

[75] Inventors: Osawa Takasi, Saitama; Katsumi Iida, both of Saitama, Japan

[73] Assignee: Diesel Kiki Co., Ltd., Tokyo, Japan

[21] Appl. No.: 272,740

[22] Filed: Nov. 17, 1988

[30] Foreign Application Priority Data

Nov. 21, 1987 [JP] Japan .................. 62-294598
Nov. 21, 1987 [JP] Japan .................. 62-294599

[51] Int. Cl.$^4$ .......................... F25D 17/00; F24J 2/38
[52] U.S. Cl. ........................................ 62/180; 126/425; 165/43
[58] Field of Search ............... 62/209, 180; 165/43, 165/28; 236/91 G, 91 C, 91 E; 126/425

[56] References Cited

U.S. PATENT DOCUMENTS 4,491,727  1/1985  Appelbaum et al. ......... 126/425 X

FOREIGN PATENT DOCUMENTS 0063347  5/1980  Japan ........................... 236/91 F Primary Examiner—William E. Wayner
Attorney, Agent, or Firm—Koda & Androlia

[57] ABSTRACT

An air conditioning apparatus for a car including a solar radiation sensor having right and left side elements for receiving solar radiation coming from right and left sides of the car, respectively, an arithmetic device for generating a control signal based upon the outputs from both light receiving elements and a control device for driving a plurality of air conditioning devices on the basis of the control signal.

2 Claims, 21 Drawing Sheets

AIR CONDITIONING APPARATUS FOR CAR

BACKGROUND OF THE INVENTION

1. Field of the Invention

The present invention relates to an air conditioning apparatus for car adapted to perform air conditioning and blast control in accordance with conditions of solar radiation.

2. Description of Prior Art

The air conditioning apparatus is known, which is adapted to detect conditions of solar radiation predominant within a car compartment such as a solar radiation intensity and a direction of solar radiation, then to perform air conditioning and/or blast control through a blast nozzle according to said conditions of solar radiation and thereby to optimize a distribution of conditioned air within the car compartment.

Such air conditioning apparatus of prior art is provided with a solar radiation detector comprising a light receiving element to detect solar radiation coming from the right side, a light receiving element to detect solar radiation coming from the left side of the car and a douser, and further provided with a controller adapted to control various air conditioning means on the basis of a detection value of said detector. Detection values $I_R$, $I_L$ obtained from the right and left side light receiving elements of said solar radiation detector exhibit characteristics as indicated by broken lines in FIG. 22. It should be understood that the characteristics $I_R$, $I_L$ were plotted, with respect to the sun at a constant height ($\beta = 60°$), as the sunlight incident angle changes within a range (0° through 90°) between the front and the right side of the car and as the sunlight incident angle changes within a range (0° through $-90°$) between the front and the left side of the car, respectively. In general, the controller controls the various air conditioning means such as a mixing door and a blower on the basis of an arithmetically corrected value obtained from the detection values of solar radiation which vary as the solar incident angle on the respective light receiving elements.

Processing of the detection values to obtain the arithmetically corrected solar radiation value has conventionally been made in any one of following manners: (1) a higher one of the right and left detection values $I_R$, $I_L$ is used as an arithmetically corrected value $I_0$ as indicated by solid lines in FIG. 22; and (2) an arithmetic value $(I_R + I_L)/9$ is obtained as an arithmetically corrected solar radiation value $I_0$ by using the right and left detection values $I_R$, $I_L$, as indicated by a solid line in FIG. 23.

With the solar radiation detector of prior art, however, both the light receiving element at the right side and the light receiving element at the left side of the car body are horizontally placed at least longitudinally of the car body. Accordingly, it is possible to detect the conditions of solar radiation so far as the sun is at a predetermined angle or higher, but when the radiation is incident on the light receiving elements from the lower sun, particularly from the front of the car body, the solar radiation detection values become too small to obtain an arithmetically corrected value of an appropriate level and therefore it will be difficult to achieve a desired air conditioning control at high accuracy.

When the method of arithmetic correction as set forth above in (1) is used, a relative sensitivity of the right side and the left side will be suddenly lowered. As a result, even when the car slightly changes its course right- or leftwards, the arithmetically corrected value $I_0$ will largely change. Various parameters, for example, blast flow rate from the blower under a control based on such arithmetically corrected value $I_0$ also suddenly change, deteriorating a comfortableness of air conditioning within the car compartment.

In the case of (2), on the other hand, the detection values of the respective light receiving elements (i.e., relative sensitivity) are low for relatively large solar radiation incident angles from right and left sides (larger than approximately 60°, $-60°$), so appropriate correction of the solar radiation value and, therefore, air conditioning control based on particular conditions of solar radiation become difficult.

In view of such problems encountered by the air conditioning apparatus of prior art as have been mentioned above, the present invention is proposed hereby to solve them effectively.

SUMMARY OF THE INVENTION

Accordingly, a primary object of the present invention is to provide an air conditioning apparatus for car allowing not only a position of a blast distributing door to be continuously controlled according to a detection value of a solar radiation sensor but also an arithmetically corrected value higher than a predetermined value to be obtained without being significantly affected by a height of the sun.

To achieve the object as set forth above, the present invention provides an air conditioning apparatus for car comprising a solar radiation sensor having at least one right side light receiving element and at least one left side light receiving element, these light receiving elements being mounted on right and left sides of a car body with their light receiving surfaces being inclined towards the front of said car body, arithmetic solar radiation value correcting means adapted to, when the detection value output from said right side light receiving element is larger than the detection value output from the left side light receiving element, compare a value corresponding to a sum of said both detection values multiplied by a coefficient with the detection value of the right side light receiving element and then output the larger value of these both values as the arithmetically corrected solar radiation value, on one hand, and adapted to, when the detection value output from said right side light receiving element is smaller than the detection value output from said left side light receiving element, compare a value calculated in the same manner as mentioned above with the detection value output from the left side light receiving element and then output the larger value of these both values as the arithmetically corrected solar radiation value, and control means adapted to drive various air conditioning devices on the basis of the arithmetically corrected solar radiation value output from said arithmetic solar radiation value correcting means.

The present invention further provides an air conditioning apparatus for car comprising a solar radiation sensor having at least one right side light receiving element and at least one left side light receiving element, these light receiving elements being mounted on right and left sides of a car body with their light receiving surfaces being inclined towards the front of said car body, solar radiating direction calculating means adapted to compare the detection value output from said right side light receiving element with the detection value output from said left side light receiving element so as to determine whether the solar radiating direction is predominant in right or left side range of the car, and adapted to output a value derived from a differential detection value of said right and left side light receiving elements as the solar radiating direction values in the right and left side ranges, respectively, and control means adapted to drive various air conditioning devices, for example, a blast distributing door, on the basis of the output signal from said solar radiating direction calculating means.

Additionally, the present invention provides an air conditioning apparatus for car comprising a solar radiation sensor having at least one right side light receiving element and at least one left side light receiving element, these light receiving elements being mounted on right and left sides of a car body with their light receiving surfaces being inclined towards the front of said car body, solar radiating direction calculating means adapted to compare the detection value output from said right side light receiving element with the detection value output from said left side light receiving element so as to determine whether the solar radiating direction is predominant in right or left range of the car, solar radiation intensity calculating means adapted to, within a predetermined range of the solar radiating direction extending from the front to the right and left sides of the car body, output a value calculated on the basis of the solar radiating direction value from said solar radiating direction calculating means and the detection value from said right or left side light receiving element as the arithmetically corrected solar radiation intensity value, but, outside of said predetermined solar radiating direction range, output the detection value of said right or left side light receiving element as the arithmetically corrected solar radiation intensity value, and control means adapted to drive a blast distributing door to its optimal position on the basis of the output signal from said solar radiating direction calculating means and to drive various air conditioning devices on the basis of the arithmetically corrected solar radiation intensity value from said solar radiation intensity calculating means.

Other features, objects and advantages of the invention will be readily apparent from the following description of preferred embodiments thereof made in reference with the accompanying drawings.

BRIEF DESCRIPTION OF DRAWING

FIGS. 1 through 9 show a first preferred embodiment of the present invention wherein:

FIG. 1 is a schematic diagram of the air conditioning apparatus;

FIG. 4 is a left side view of a manner in which the solar radiation sensor is mounted;

FIG. 5 is a flow chart showing a main flow of air conditioning control;

FIG. 6 is a flow chart of solar radiation value correcting arithmetic processing;

FIG. 8 is a characteristic diagram plotting detection values and calculated values; and FIG. 9 is a characteristic diagram plotting arithmetically corrected values;

FIGS. 10 through 15 show a second preferred embodiment of the present invention wherein;

FIG. 10 is a flow chart showing a main flow of air conditioning control;

FIG. 11 is a flow chart of solar radiating direction value correcting arithmetic processing;

FIG. 12 is a characteristic diagram plotting a relationship between the solar radiating direction and the arithmetic value thereof;

FIG. 13 is a flow chart of solar radiation intensity correcting arithmetic processing;

FIG. 14 is a characteristic diagram showing a relationship between the incident direction $\alpha$ and the displacement factor $X_0$; and FIG. 15 is a characteristic diagram plotting the arithmetically corrected value of the solar radiation intensity;

FIGS. 16 and 17 show a second embodiment of the solar radiating direction calculating means wherein:

FIG. 16 is a flow chart showing processing performed thereby; and

FIG. 17 is a characteristic diagram thereof;

FIGS. 18 and 19 show a third embodiment of the solar radiating direction calculating means wherein:

FIG. 18 is a flow chart showing processing performed thereby; and

FIG. 19 is a characteristic diagram thereof;

FIGS. 20 and 21 show a fourth embodiment of the solar radiating direction calculating means wherein:

FIG. 20 is a flow chart showing processing performed thereby; and

FIG. 21 is a characteristic diagram thereof; and

DETAILED DESCRIPTION OF PREFERRED EMBODIMENTS

FIGS. 1 through 9 show a first preferred embodiment.

Figure 1:
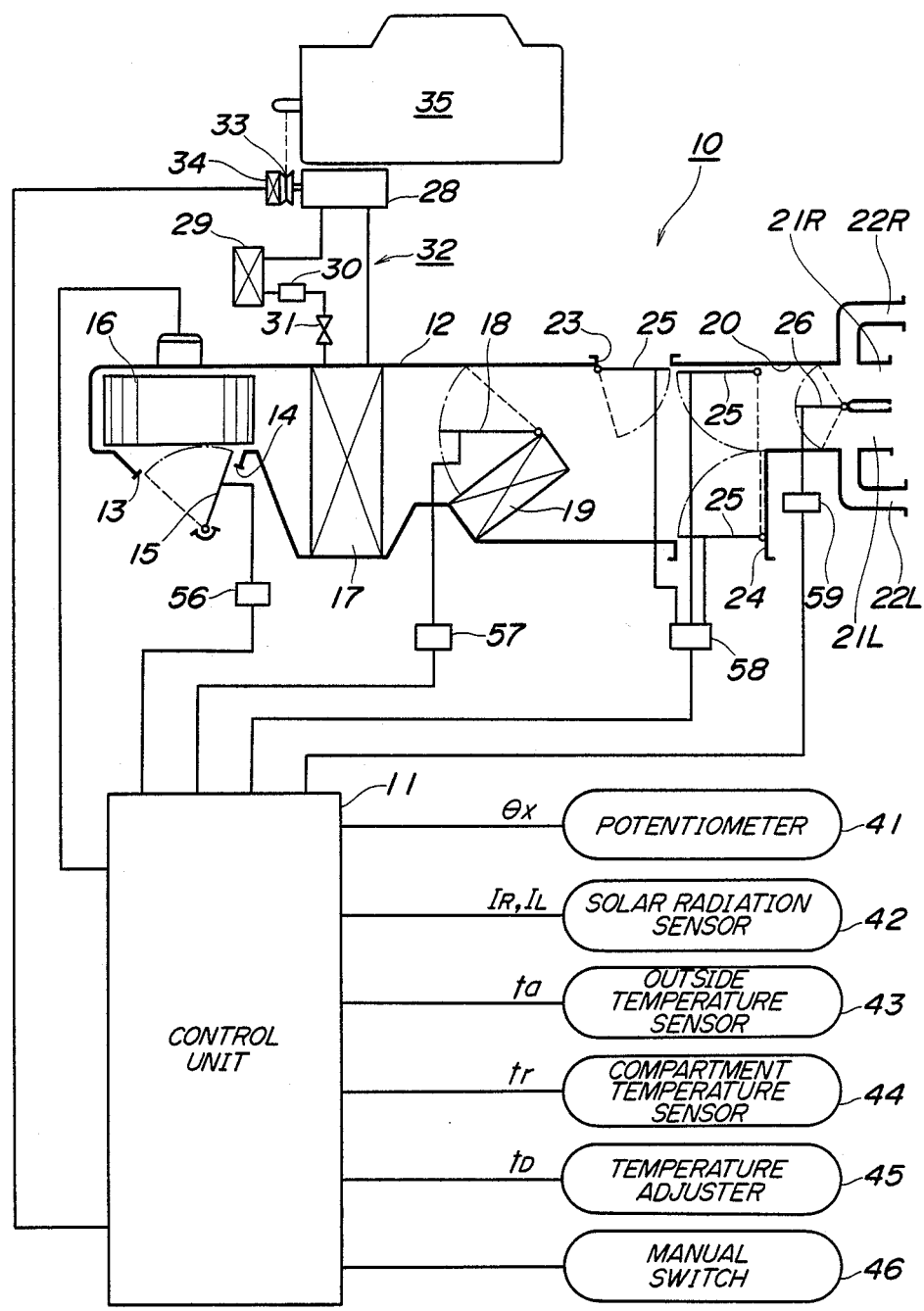

FIG. 1 schematically shows a layout of an air conditioning apparatus 10 comprising a duct 12 and various devices and a control unit 11 arranged along said duct 12.

At the uppermoststream of the duct 12, there is provided an intake door 15 adapted to switch an inside air inlet 13 and an outside air inlet 14. There are successively provided along the duct 12 from the upstream side thereof a blower 16, an evaporator 17, a mixing door 18, and a heater core 19, and, at the lowermoststream of the duct 12, there are provided vent nozzle means 20, a defrost nozzle 23 and a heat nozzle 24 each communicating with a car compartment. These nozzles 20, 23, 24 are selectively switched by a switching doors 25, 25, 25 for mode switching to be opened or closed.

Said vent nozzle means 20 include right and left central nozzles 21R, 21L and right and left outer nozzles 22R, 22L. A blast distributing door 26 is provided upstream of these nozzles 21R, 22R, 21L, 22L to distribute amount of blast to right and left.

Said evaporator 17 constitutes, together with a compressor 28 adapted for compression and circulation of cooling medium, a condenser 19, a receiver tank 30 and an expansion valve 31, a cooler 32 wwhich is driven by a pulley 33 to which a power is transmitted from an engine 35, through a magnet clutch 34. An air stream introduced from said blower 16 is cooled as it flows through the evaporator 17.

Engine cooling water flows through said heater core 19 and said heater core 19 heats the air stream which has left the evaporator 17. Rate of the air stream flowing through the heater core 19 depends on an opening of the mixing door 18. The respective switching doors 25, 25, 25 for mode switching selectively regulate the vent nozzle means 20, the defrost nozzle 23 and the heat nozzle 24 so that a conditioned air stream is supplied into the car compartment.

Said control unit 11 includes a potentiometer 41 to detect an opening $\theta_x$ of the mixing door 18, a solar radiation sensor 42 to detect factors such as solar radiation amount $I_R$, $I_L$, an outside temperature sensor 43 to detect an outside temperature $t_a$, a compartment temperature sensor 44 to detect a compartment temperature $t_r$ and a temperature adjuster 45 to adjust the compartment temperature to a predetermined temperature $t_D$, and supplied from these components with respective output signals. A manual switch 46 for manually operating the air conditioning apparatus is connected to the control unit 11.

Figure 2A:
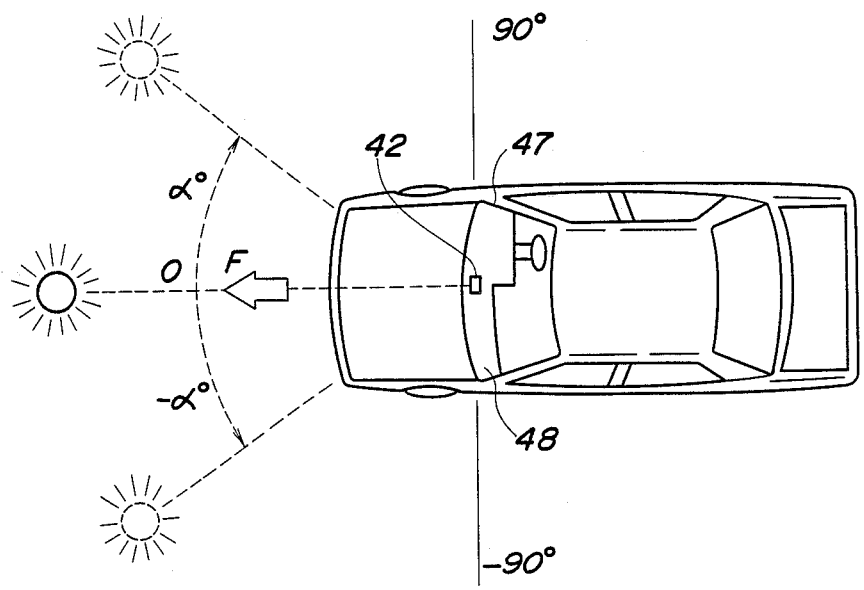
FIG. 2(a), (b) are plan and side views respectively showing a location of a solar radiation sensor.
Figure 2B:
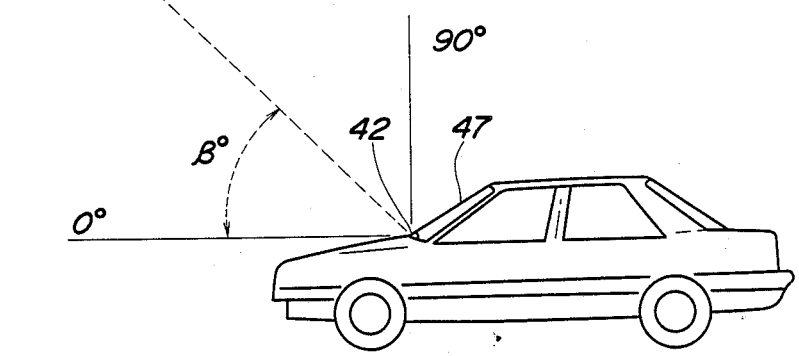
Figure 3A:
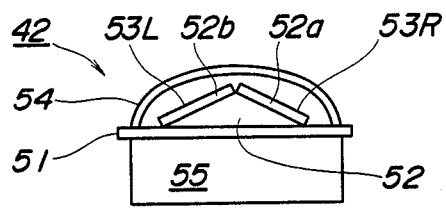
FIG. 3(a), (b), (c), (d) are respectively rear, left side, and perspective views of the solar radiation sensor and a diagram of its equivalent circuit.
Figure 3B:
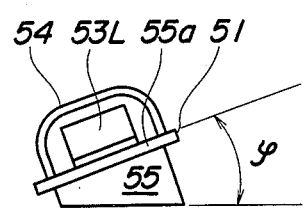
Figure 3C:
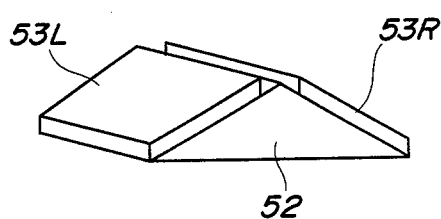
Figure 3D:
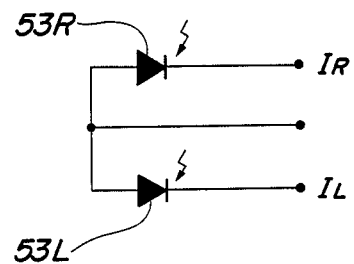
Figure 4:
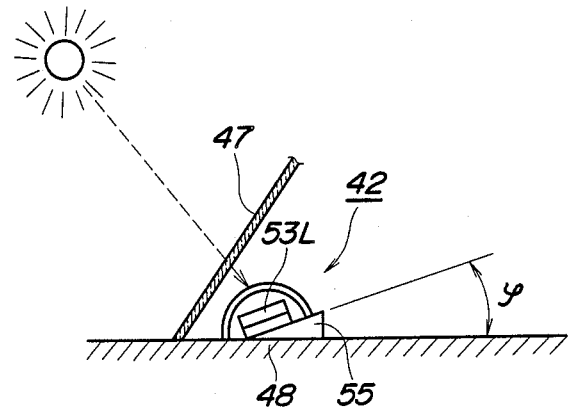

Said solar radiation sensor 42 is, as shown by FIG. 2(a), (b) and FIG. 4, mounted on an instrument panel 48 inside a windshield 47 of the compartment. As shown by the rear view of FIG. 3(a), the side view of FIG. 3(b) and the perspective view of FIG. 3(c), the solar radiation sensor 42 is mounted on a base plate 51 and comprises a stand 52 having thereon sloping surfaces 52a, 52b sloping from the center of said stand 52 right- and leftwards, respectively, a right side photodiode (light receiving element) 53R placed on the sloping surface 52 and a left side photodiode (light receiving element) 53L placed on the sloping surface 52b of the stand 52, and a light attenuating filter 54 provided above said stand 52 and said photodiodes 53R, 53L to cover them. Thus, said right and left photodiodes 53R, 53L have their light receiving surface directed at an angle right- and leftwards of the car. Said base plate 51 is mounted on an inclined pedestal 55 having an inclined surface 55a facing up- and rearwards at a predetermined angle $\Psi$. The base plate 51 is on this inclined surface 55a. Thus, both the photodiodes 53R, 53L are inclined not only right- and leftwards, respectively, but also inclined forwards by the angle $\Psi$. This solar radiation sensor 42 is connected to said control unit 11 and the equivalent circuit thereof may be represented as shown by FIG. 3(d). In this way, even when the sun height $\beta$ is relatively low and the solar radiation comes from the front of the car, the solar radiation sensor 42 can reliably detect conditions of solar radiation without being affected by the sun height.

Said control unit 11 further includes a microcomputer having various elements such as I/O ports, CPUs and memories, A/D converters adapted to convert respective input signals to corresponding digital signals, and drive circuits by which various air conditioning devices are controllably driven. When it is desired to drive the air conditioning apparatus in AUTO mode, detection values $I_R$, $I_L$ obtained from the solar radiation sensor 42 are used to calculate a corrective solar radiation value $I_0$ which is, in turn, combined with input data $t_a$, $t_r$, $t_D$ coming from the other sensors 43, 44, 45 respectively, to obtain a composite signal (i.e., control signal) T so that respective control signals based on this composite signal T control a motor actuator 56 to switch the intake door 15, control the magnet clutch 34 to actuate the cooler 32, control a motor actuator 57 to open or close the mixing door 17, control a motor actuator 58 to switch the nozzle mode doors 25, 25, 25 and control a motor actuator 59 to regulate the blast distributing door 26, respectively. The manual switch 46 may be activated to switch the inside air and the outside air and to effect the nozzle mode switching in MANUAL mode.

Said microcomputer serves as the arithmetic solar radiation correcting means and also as the control means.

Figure 5:
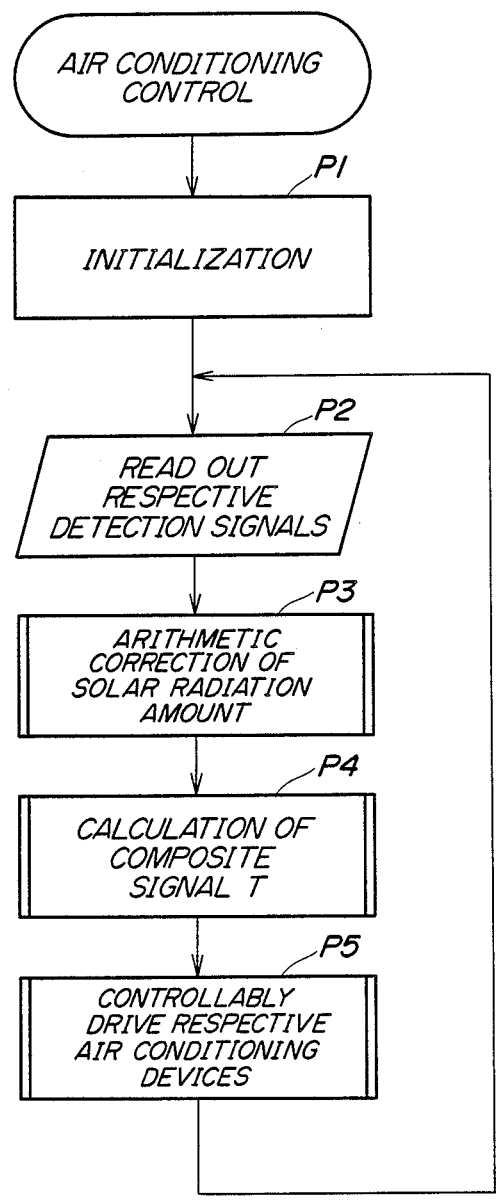
Figure 6:
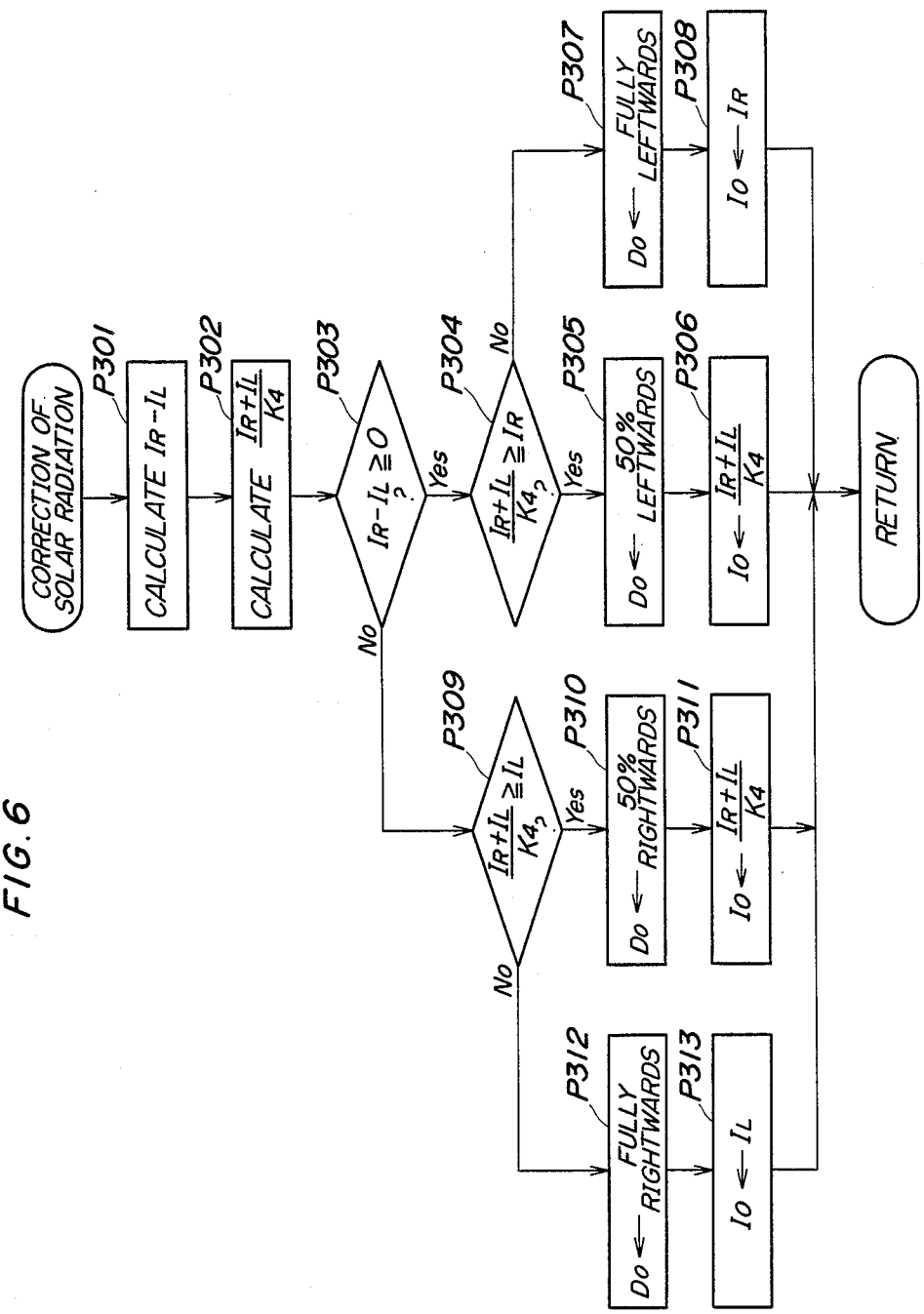

Now air conditioning control of the air conditioning apparatus will be discussed in reference with the flow charts shown by FIGS. 5 and 6. FIG. 5 shows a main routine of the air conditioning control and FIG. 6 shows a subroutine of the arithmetic solar radiation value correcting.

When the air conditioning apparatus is started, the air conditioning control starts according to the main routine. Step $P_1$ initializes data in respective registers and RAMs of the microcomputer, step $P_2$ reads out respective output signals $I_R$, $I_L$, $t_a$, $t_r$, $t_D$ and step $P_3$ calculates a corrective solar radiation value $I_0$ on the basis of said detection data $I_R$, $I_L$ output from the solar radiation sensor 42. The composite signal T to control the entire air conditioning apparatus is calculated by using said arithmetically corrected solar radiation value $I_0$ and said detection data $t_a$, $t_r$, $t_D$ from the other sensors 43, 44, 45, according to a following equation:

$$T = K_1 t_r + K_2 t_a + I_0 - K_3 t_D$$

where $K_1$, $K_2$, $K_3$ respectively represent coefficients.

At step $P_5$, said composite signal T controls the respective drive circuits to drive the intake door 15 to switch the inside air and the outside air, the blower 16, the compressor 28, the mixing door 18, the nozzle mode doors 25, 25, 25, the blast distributing door 26 etc.

Figure 7A:
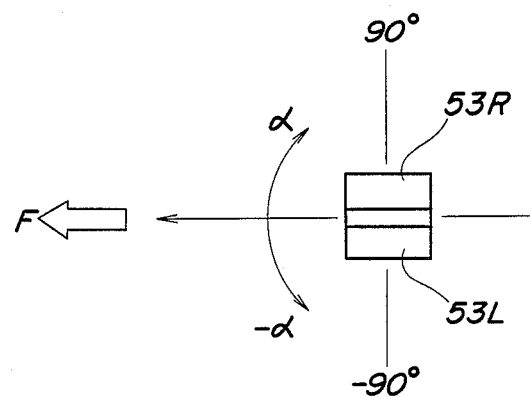
FIG. 7(a) is a plan view showing a detection ranges of the solar radiation sensor.
Figure 7B:
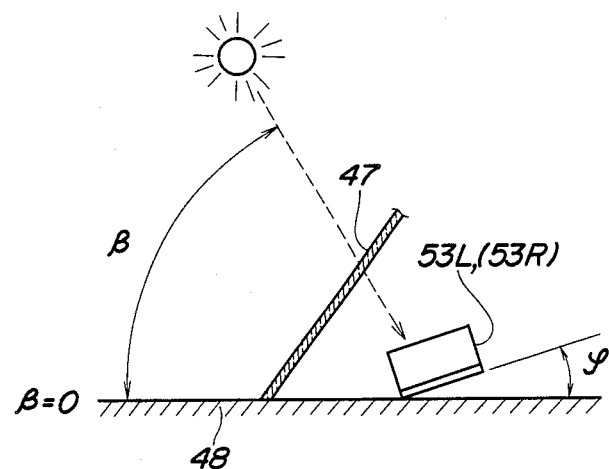
FIG. 7(b) is a side view showing a relationship between the solar radiation sensor and a height of the sun.
Figure 8:
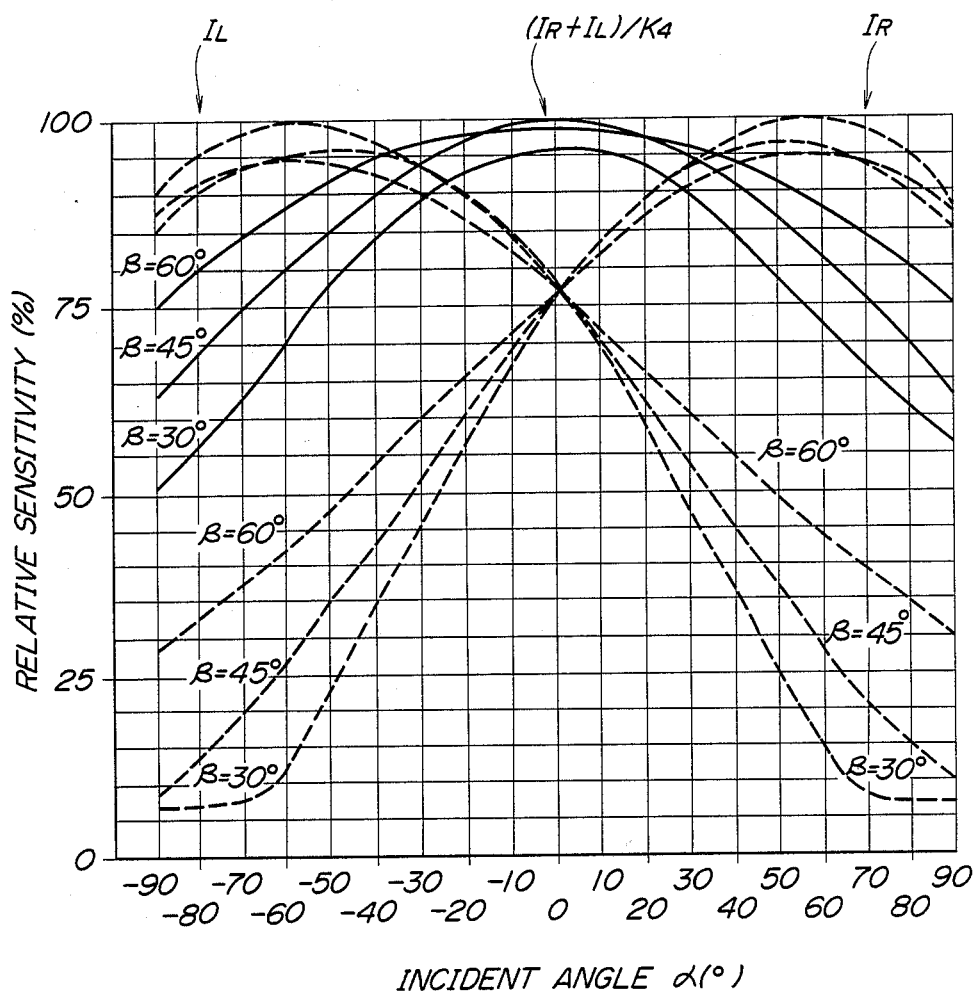

Concerning said processing of the solar radiation value correction, stap $P_{301}$ uses the detection value $I_L$ of the left side photodiode 53L and the detection value $I_R$ of the right side photodiode 53R to perform a calculation of $I_R - I_L$ and step $P_{302}$ performs a calculation of $(I_R + I_L)/K_4$, as shown by FIG. 6. Both the detection values $I_R$, $I_L$ depend on the incident angles (i.e., the incident angle $\alpha$ from the right side and the incident angle $-\alpha$ from the left side) so far as the sun height is constant as shown by FIG. 7(a), (b), and further depend on the sun height $\beta$. An arrow F indicates a direction in which the car moves. FIG. 8 shows characteristics of right and left detection values $I_R$, $I_L$ over the right side range defined by the incident angle $\alpha = 0°$ through $90°$ and the left side range defined by the incident angle $-\alpha = 0°$ through $-90°$ for the sun height $\beta$ of $30°$, $45°$, $60°$. The value $(I_R + I_L)/K_4$ calculated by step $P_{304}$ is plotted by solid lines in FIG. 8.

Step $P_{303}$ determines whether $I_R - I_L \geq 0$ or not and, if a positive determination is made, it is determined that the sunlight is incident from right side of the car. The main routine proceeds to steps $P_{304}$ through $P_{308}$. If a negative determination is made, it is concluded that the sunlight is incident from the left side of the car and the main routine proceeds to steps $P_{309}$ through $P_{313}$.

Step $P_{304}$ determines whether the calculated value $(I_R + I_L)/K_4$ is larger than $I_R$ or not and, if a positive determination is made, the main routine proceeds to steps $P_{305}$, $P_{306}$. Step $P_{305}$ adjusts a position $D_0$ of the blast distributing door 26 and step $P_{306}$ defines the calculated value $(I_R+I_L)/K_4$ larger than the detection value $I_R$ as the arithmetically corrected solar radiation value $I_0$. Said blast distributing door position $D_0$ is illustrated as 50% leftwards and the blast distributing door 26 is controlled to move leftwards so that the blast amount from the right side vent nozzles 21R, 22R is more than the blast amount from the left side vent nozzles 21L, 22L by approximately 50% or higher.

If step $P_{304}$ determines that the calculated value $(I_R+I_L)/K_4$ is smaller than $I_R$, step $P_{307}$ adjusts the blast distributing door position $D_0$ fully leftwards, and step $P_{308}$ defines the detection value $I_R$ larger than the calculated value as the arithmetically corrected solar radiation value $I_0$. Once the blast distributing door position $D_0$ has been adjusted fully leftwards, the air blast is substantially supplied only from the right side vent nozzles 21R, 22R.

When said step $P_{303}$ determines that $I_R-I_L \geqq 0$ is not established, step $P_{309}$ determines whether the calculated value $(I_R+I_L)/K_4$ is larger than $I_L$ or not. If a positive determination is made, step $P_{310}$ adjusts the blast distributing door position $D_0$ 50% rightwards and step $P_{311}$ defines the calculated value $(I_R+I_L)/K_4$ larger than the detection value $I_L$ as the arithmetically corrected solar radiation value $I_0$. In this case, the adjustment of the blast distributing door position results in the air blast amount from the left side vent nozzles 21L, 22L more than that from the right side vent nozzles by approximately 50% or higher.

If step $P_{309}$ determines that the calculated value $(I_R+I_L)/K_4$ is smaller than $I_L$, step $P_{312}$ adjusts the blast distributing door position $D_0$ fully rightwards and then step $P_{313}$ defines the detection value $I_L$ larger than the calculated value as the arithmetically corrected solar radiation value $I_0$. In this case, the blast distributing door 26 displaces fully rightwards and the air stream is substantially supplied only from the left side vent nozzles 21L, 22L. At the same time, the composite signal T is calculated on the basis of said arithmetic corrective value $I_0$, so the air blast amount supplied from the blower 16 as well as the opening $\theta_x$ of the mixing door 18 and, therefore, air conditioning are controlled according to said arithmetic corrective value $I_0$.

Figure 9:
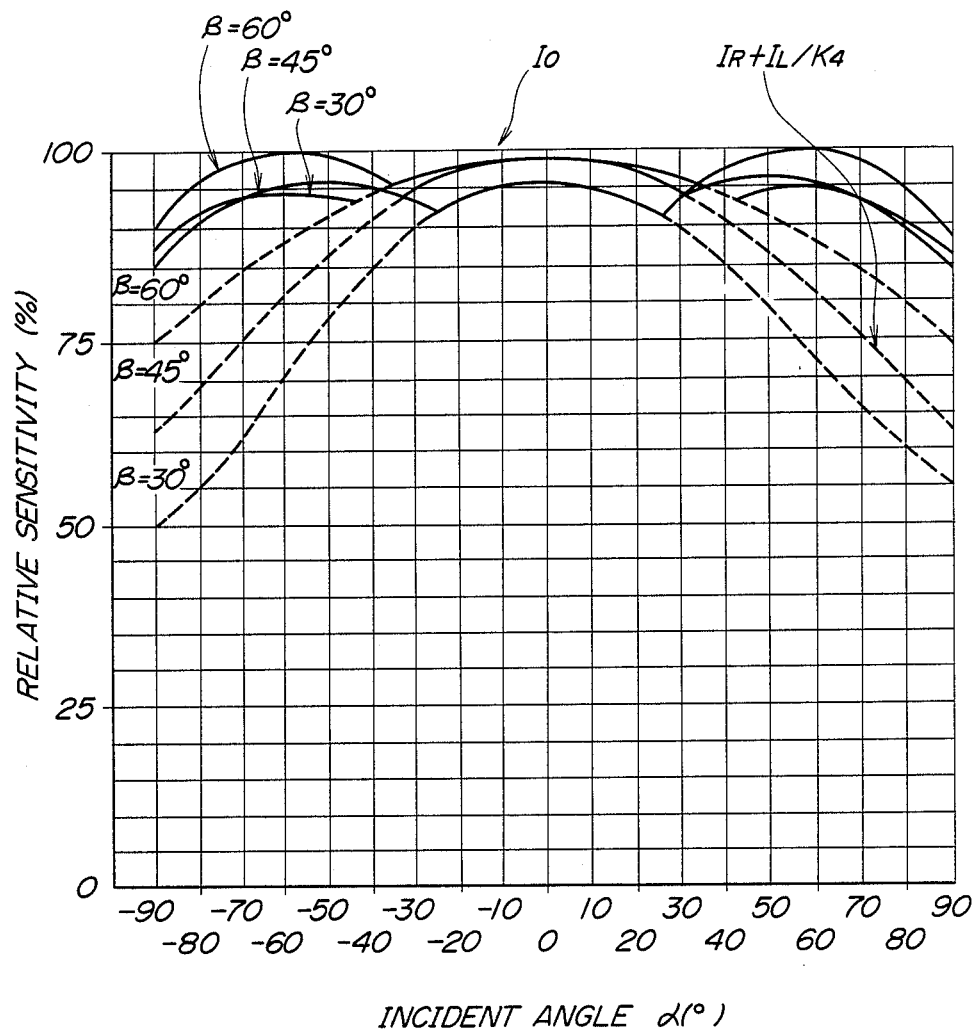

Thus, the arithmetically corrected solar radiation value $I_0$ over the entire right and left range defined by an angle between $-90°$ and $90°$ can be obtained (for the sun height of 30°, 45°, 60°) which exhibits a flat characteristic within the range higher than a predetermined value as indicated by solid lines in FIG. 9, advantageously reducing a possibility that the relative sensitivity is too low to perform a proper solar radiation value correction and a partial decrease of the corrective solar radiation value causes the air blast amount supplied from the blower to fluctuate. Furthermore, the air blast amount to be supplied from the right and left side vent nozzles is effectively controlled in accordance with the sunlight incident direction at right or left side of the car, improving the comfortableness within the car compartment achieved by the air conditioning control.

Although the first embodiment has been discussed hereinabove with respect to the case in which the blast distributing door for the vent nozzles is controlled, it is also possible to control the blast distributing doors for the defrost nozzle branched into right and left sides or for the heat nozzle.

Now a second preferred embodiment will be considered.

FIGS. 10 through 15 show this embodiment.

Figure 10:
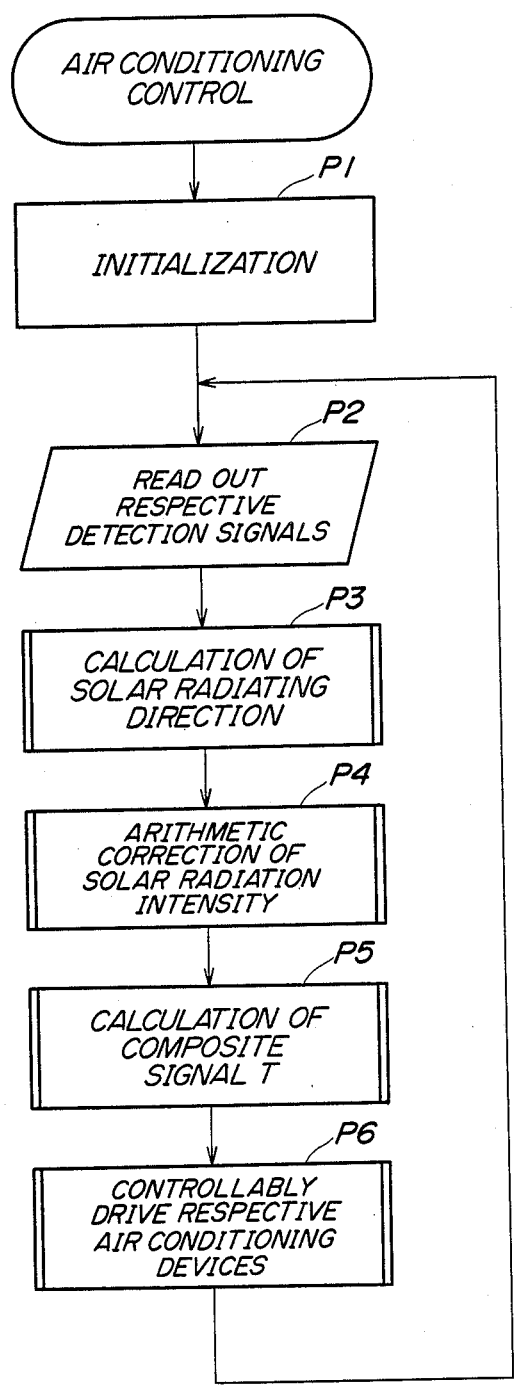
Figure 11:
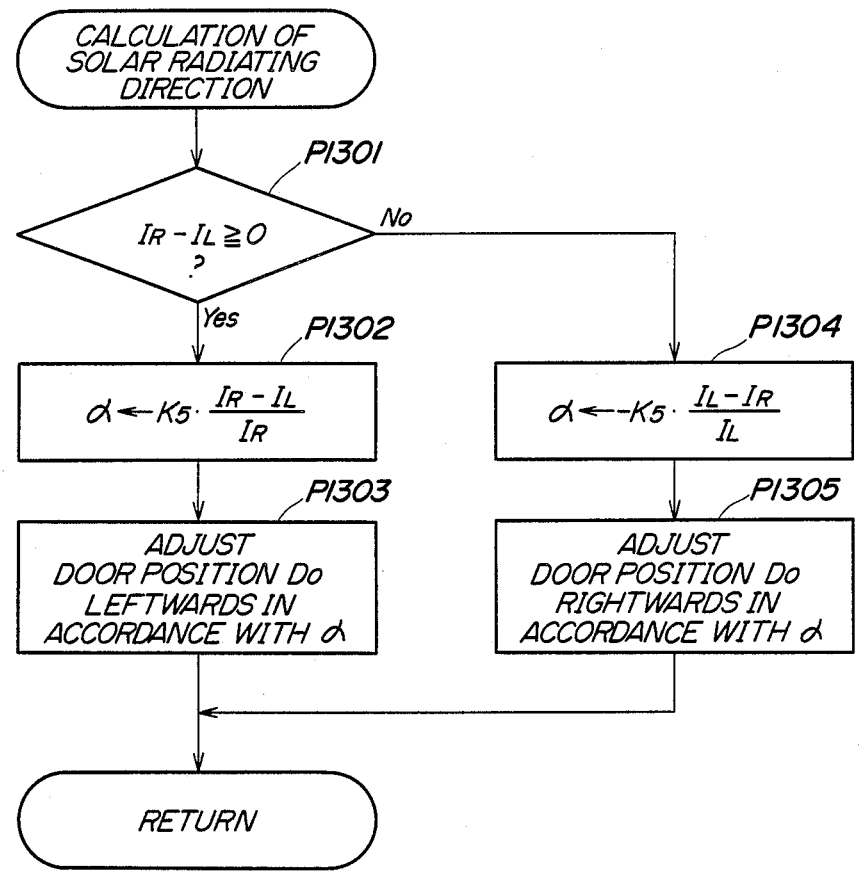
Figure 13:
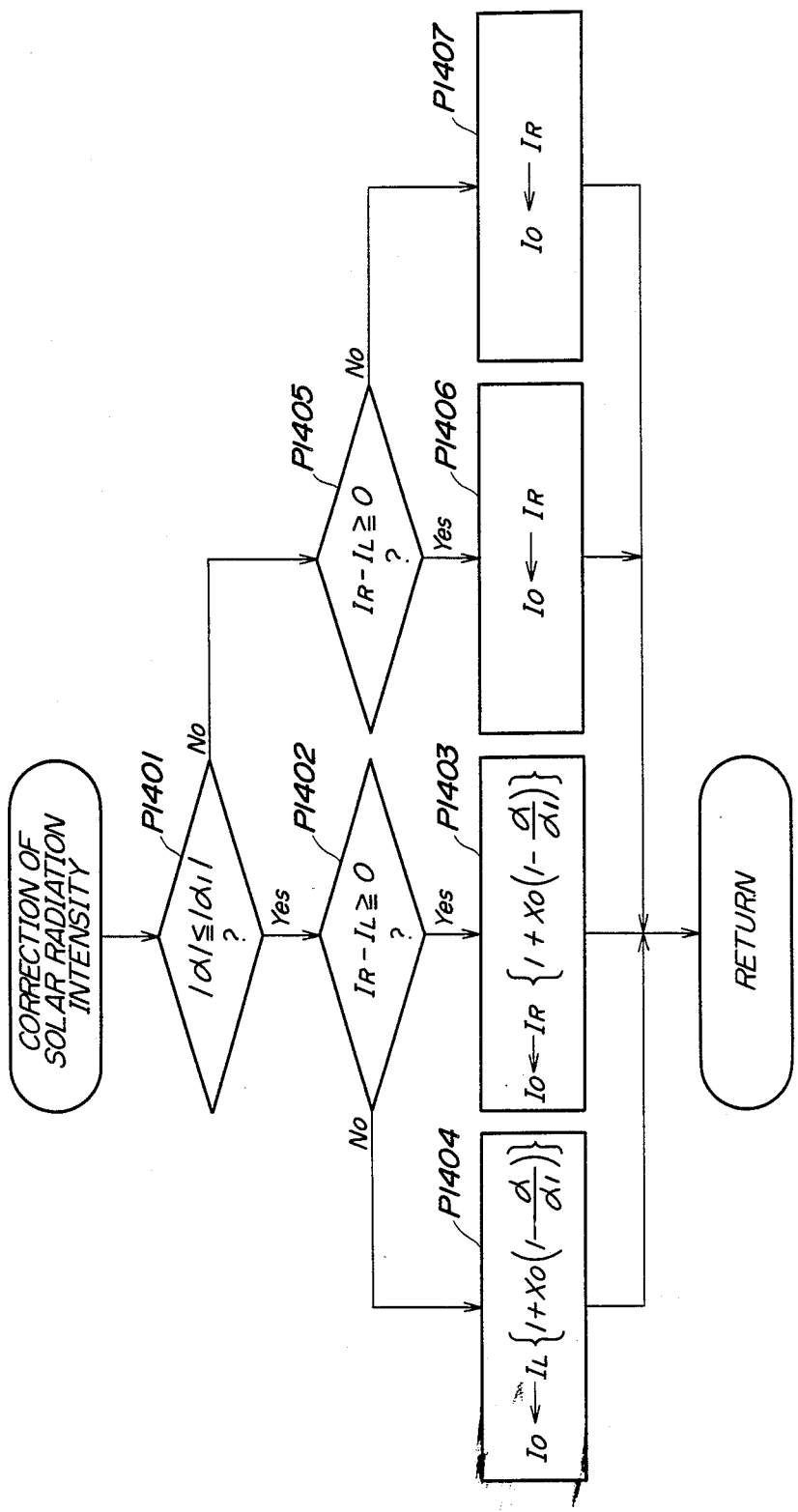

This embodiment is substantially similar to the first embodiment except that the arithmetic solar radiation correcting means is replaced by the solar radiating direction calculating means and the arithmetic solar radiation intensity correcting means both comprising the microcomputers in the control unit 11. The air conditioning apparatus, according to this embodiment, operates on the basis of flow charts shown by FIGS. 10, 11 and 13. FIG. 10 shows a main routine of the air conditioning control processing, FIG. 11 shows a subroutine of the solar radiating direction processing and FIG. 13 shows a subroutine of the solar radiation intensity correction processing.

Upon starting of the air conditioning apparatus, the air conditioning control starts according to the main routine of FIG. 10. Step $P_{11}$ initializes data stored in respective registers and RAMs of the microcomputers, step $P_{12}$ reads out the respective detection signals $I_R$, $I_L$, $t_a$, $t_r$, $t_D$ provided from the respective sensors 42, 43, 44 and the temperature adjuster 45, and then step $P_{13}$ performs arithmetic processing of the solar radiating direction by using the detection data $I_R$, $I_L$ provided from the solar radiation sensor 42. The composite signal T used to control the entire air conditioning apparatus is calculated by using said arithmetically corrected solar radiation value $I_0$ and said detection data $t_a$, $t_r$, $t_D$ provided from the other sensors 43, 44, 45, respectively, in accordance with a following equation:

$$T=K_1 t_r + K_2 t_a + I_0 - K_3 t_D$$

where $K_1$, $K_2$, $K_3$ respectively represent coefficients.

At step $P_{15}$, said composite signal T controls the respective drive circuits to drive the intake door 15 to switch the inside air and the outside air, the blower 16, the compressor 28, the mixing door 18, the nozzle mode doors 25, 25, 25, the blast distributing door 26 etc.

Concerning said solar radiating direction calculating, as shown by FIG. 11, step $P_{1301}$ determines whether $I_R - I_L \geqq 0$ or not and, if a positive determination is made, step $P_{1302}$ performs an arithmetic processing $K_5 \times \{(I_R-I_L)/I_R\}$ on the assumption that the solar radiation comes from the right side of the car, i.e., the solar radiating direction is $\alpha$, and step $P_{1303}$ adjusts the position $D_0$ of the blast distributing door 26 to a value depending on the solar radiating direction $\alpha$ obtained by calculating so that the air blast amount supplied from the right side nozzles 21R, 22R correspondingly increases. If step $P_{1301}$ makes a negative determination with respect to the relationship $I_R-I_L \geqq 0$, it is concluded that the solar radiation comes from the left side of the car. Then, step $P_{1304}$ performs an arithmetic processing $-K_5 \times \{(I_L-I_R)/I_L\}$ and step $P_{1305}$ adjust the position $D_0$ of the blast distributing door 26 to a value depending on the solar radiating direction $\alpha$ so that the air blast amount supplied from the left side nozzles 21L, 22L correspondingly increases.

Figure 12:
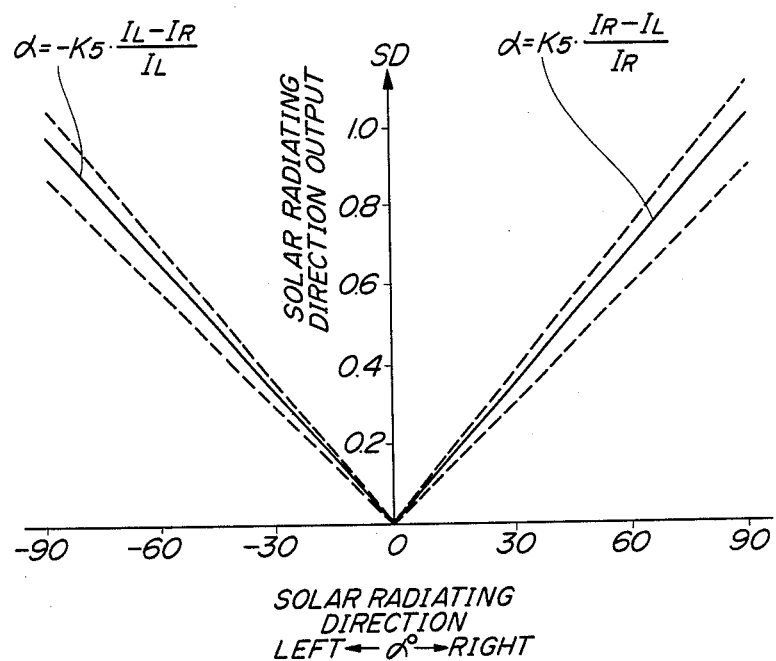
Figure 14:
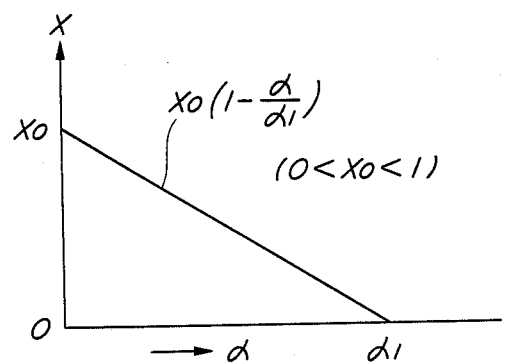

In this arithmetic processing of solar radiating direction, an arithmetic characteristic of the solar radiation direction is obtained, which increases substantially in linear fashion as a function of the lateral solar radiating direction, as shown by FIG. 12 which plots the solar radiating direction $\alpha$ versus the solar radiating direction output SD. This solar radiating direction output SD is calculated according to an equation $SD=(I_R-I_L)/I_R$.

Broken lines in FIG. 12 represent sensor output values for the sun heights $\beta$ of 15°, 60°, respectively which approximate to the above-mentioned calculated values $\alpha$. According to the sub-flow as shown by FIG. 11, actual measurement of output responsive to the solar radiating direction widely varies depending on the sun height $\beta$, but such variation can be minimized by the solar radiation sensor inclined forwards of the car. This sub-flow is preferable particularly when the sun is relatively high.

Figure 15:
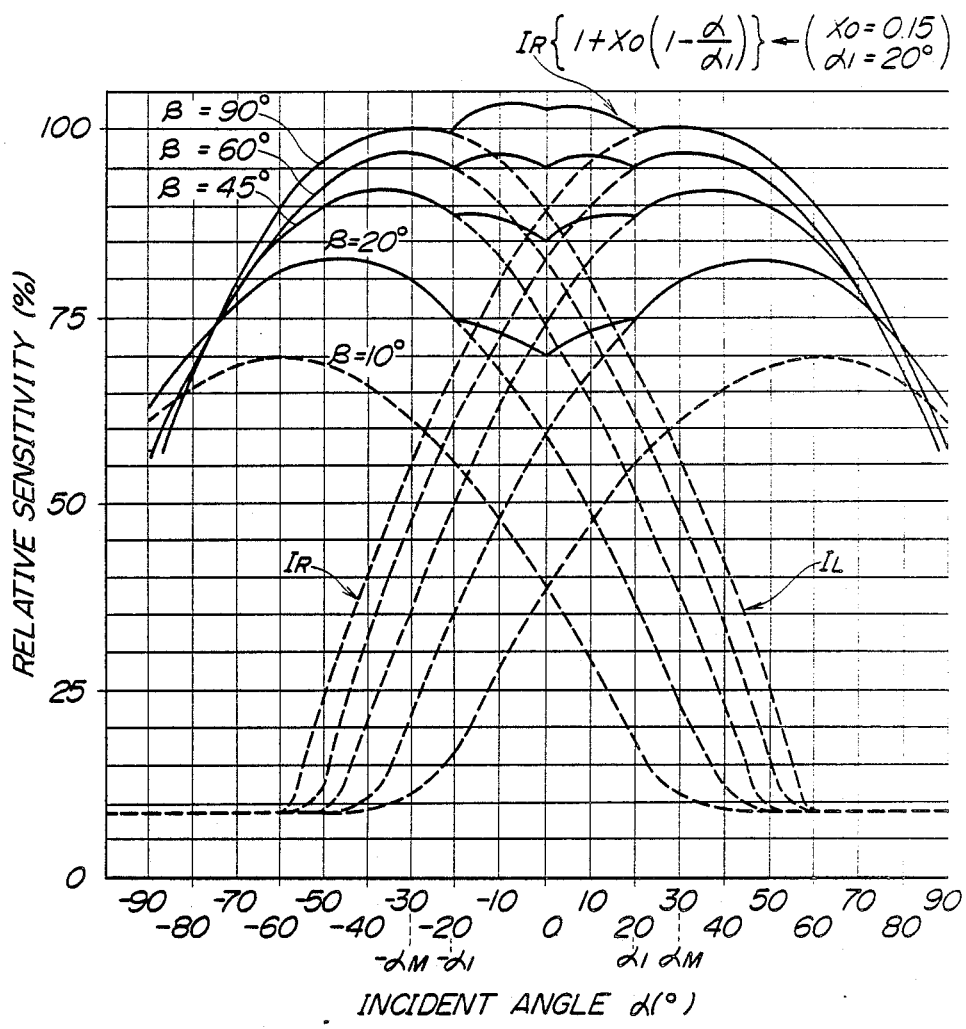

Concerning said arithmetic processing of solar radiation intensity, step $P_{1401}$ determines a value of the solar radiating direction $\alpha$(i.e., incident angle) as shown by FIG. 13. More specifically, step $P_{1401}$ determines whether absolute value of the solar radiating direction $\alpha$ obtained by the previous steps $P_{1302}$ and $P_{1303}$ is less than the absolute value of predetermined solar radiating directions $-\alpha_1$ and $\alpha_1$ or not. As shown by FIG. 15, said predetermined solar radiating directions $-\alpha_1$ and $\alpha_1$ are optionally selected within a range defined between solar radiating angles $-\alpha_M$ and $\alpha_M$ respectively corresponding to the maximum sensitivity of the detection data $I_R$, $I_L$.

If $|\alpha| \geq |\alpha_1|$, the processing proceeds to steps $P_{1402}$ through $P_{1404}$ and if it is not so, processing proceeds to steps $P_{1405}$ through $P_{1407}$. Step $P_{1402}$ uses the detection data $I_R$, $I_L$ to determine whether $I_R - I_L \geq 0$ or not. If $I_R - I_L \geq 0$, step $P_{1403}$ determines that the solar radiation within the range $-\alpha$ to $\alpha$ as shown by FIG. 15 comes from the right side of the car and defines the calculated value $I_R \times \{1 + X_0(1 - \alpha/\alpha_1)\}$ as the corrective value $I_0$. If $I_R - I_L \geq 0$ is not established, step $P_{1404}$ determines that the solar radiation within the range $-\alpha$ to $\alpha$ comes from the left side of the car and defines the calculated value $I_L \times \{1 + X_0(1 - \alpha/\alpha_1)\}$ as the corrective value $I_0$. It should be understood that said $X_0$ is set to a value of $0 < X_0 < 1$ and the term $X_0(1 - \alpha/\alpha_1)$ may be represented as a characteristic shown by FIG. 14.

If $|\alpha| \leq |\alpha_1|$ is not established, step $P_{1405}$ determines whether $I_R - I_L \geq 0$ or not. More specifically, solar radiation ranges over $-90°$ to $-\alpha_1$ and over $\alpha_1$ to $90°$ exclusive of said range $-\alpha$ to $\alpha$ shown by FIG. 15 are respectively determined. If step $P_{1405}$ determines that $I_R - I_L \geq 0$, step $P_{1406}$ concludes that the solar radiation is in the right side range between $\alpha_1$ and $90°$ and defines the right side detection data $I_R$ as the corrective value $I_0$. If $I_R - I_L \geq 0$ is not established, step $P_{1407}$ concludes that the solar radiation is in the left side range between $-90°$ and $-\alpha_1$ and defines the left side dietction data $I_L$ as the corrective value $I_0$. These arithmetic corrective values exhibit characteristic as indicated by solid lines, depending on the sun heights ($\beta = 0°$, 30°, 45°, 70°, 80°) and these arithmetic corrective values present a flat characteristic in the range higher than a predetermined value. The arithmetic processing shown by FIG. 15 is applicable also to the characteristic indicated by broken lines in FIG. 8.

Step $P_{16}$ causes the motor actuator 59 to adjust said blast distributing door 26 to said door position value $D_0$. Such adjustment of the door position is continuously controlled in accordance with the value of solar radiating direction ($\alpha$ or $-\alpha$), resulting in that the comfortableness within the car compartment can be improved by a fine control of air blast distribution. Step $P_{15}$ calculates the composite signal T on the basis of said arithmetic corrective value $I_0$ and step $P_{16}$ controls the air blast amount supplied from the blower 16 and the opening $\theta_x$ of the mixing door 18. Thus, these controls achieve the air conditioning control in accordance with the level of the arithmetically corrected solar radiation value $I_0$.

Figure 16:
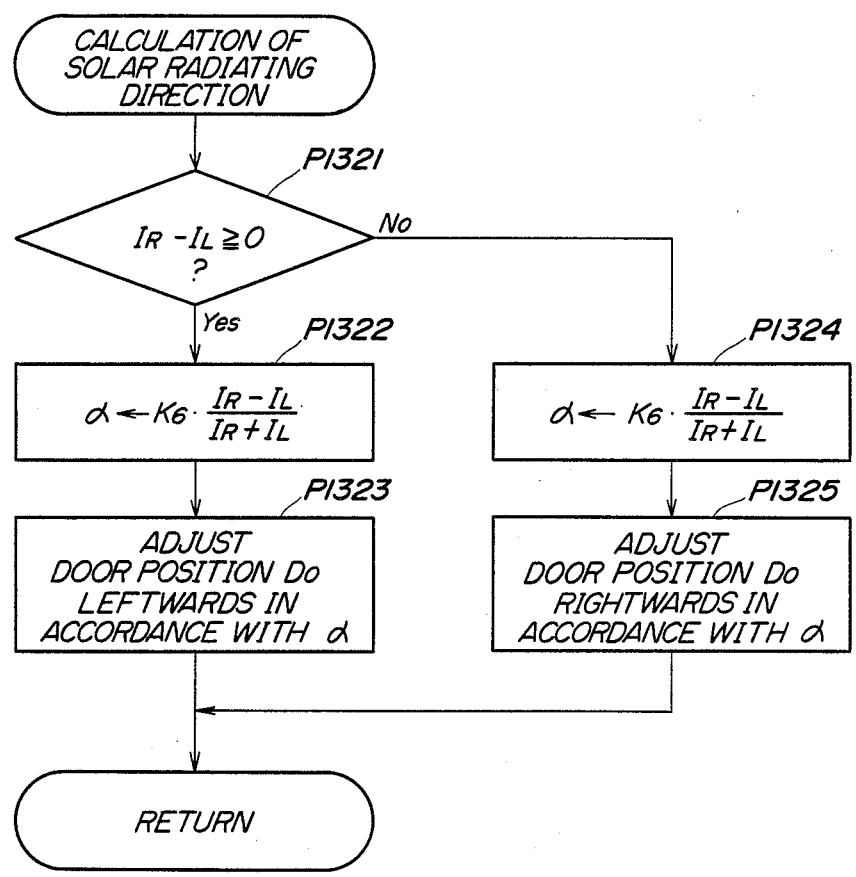
Figure 17:
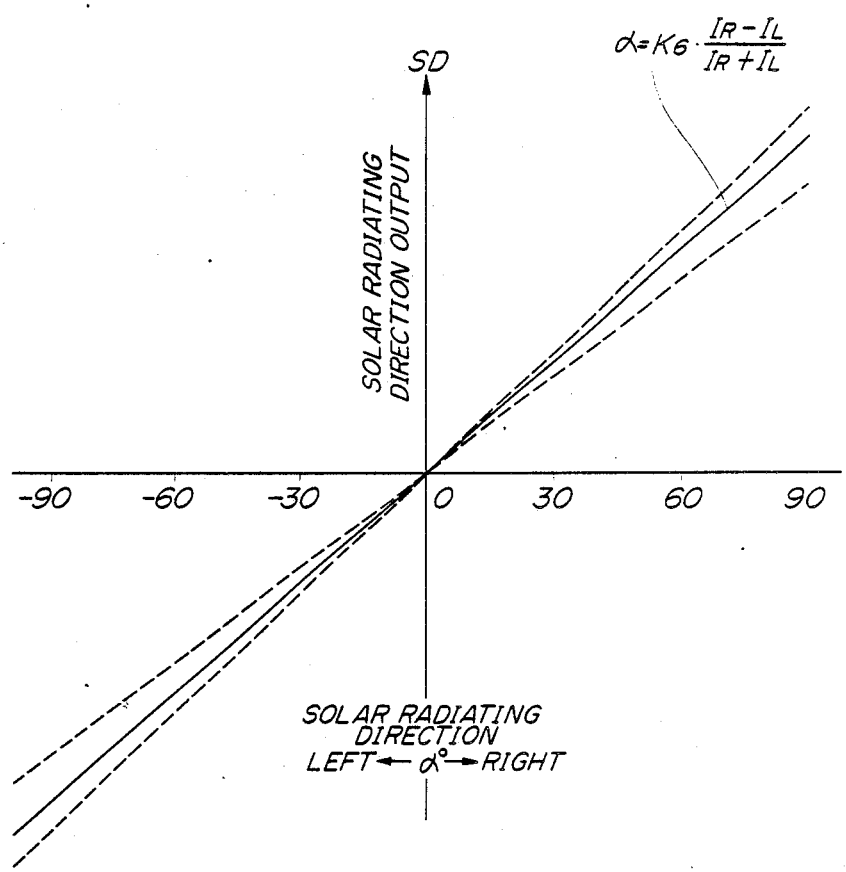
Figure 19:
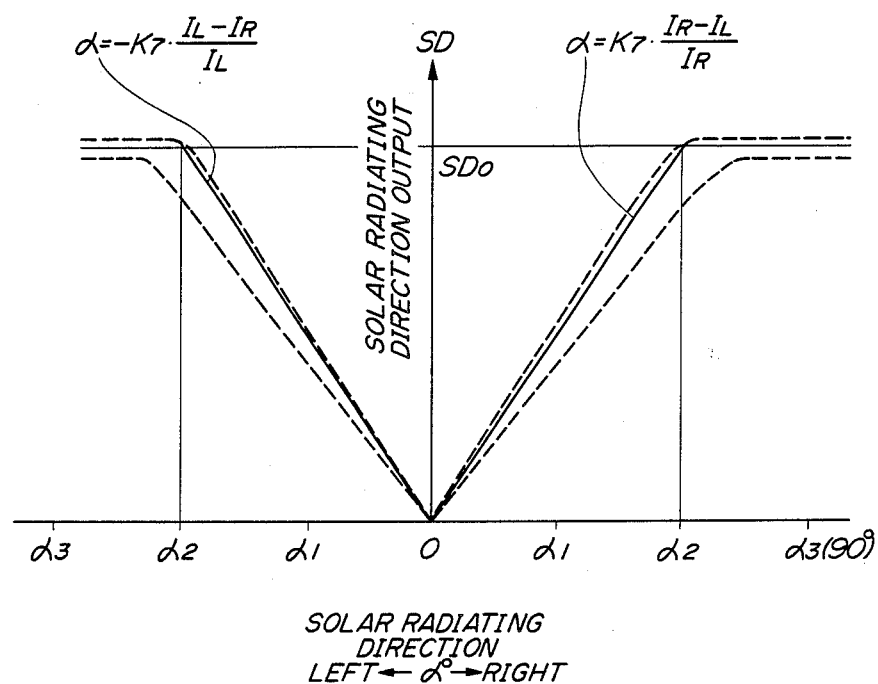
Figure 20:
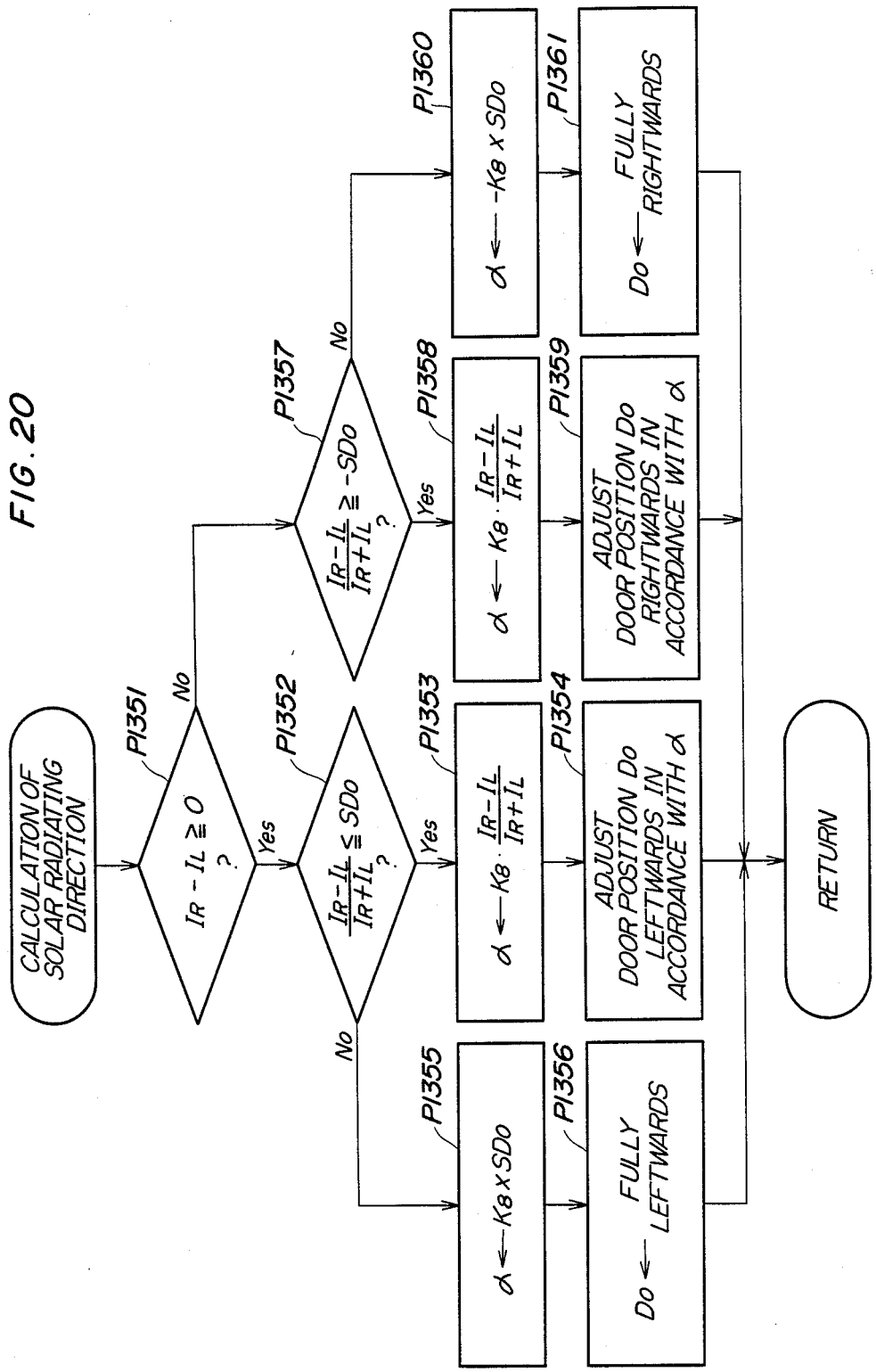
Figure 21:
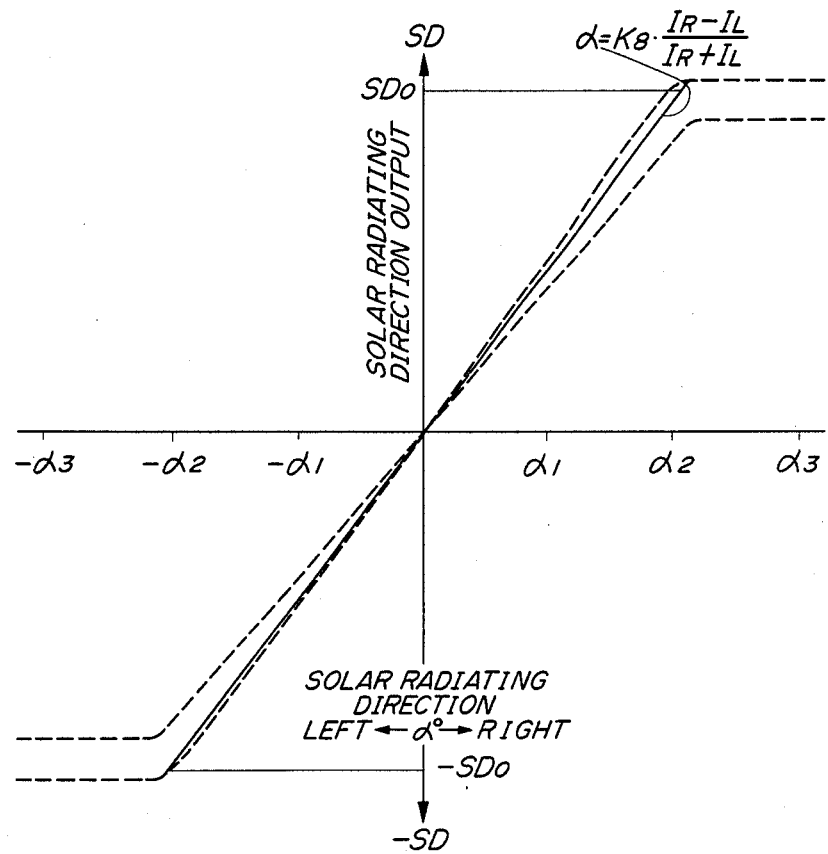
Figure 22:
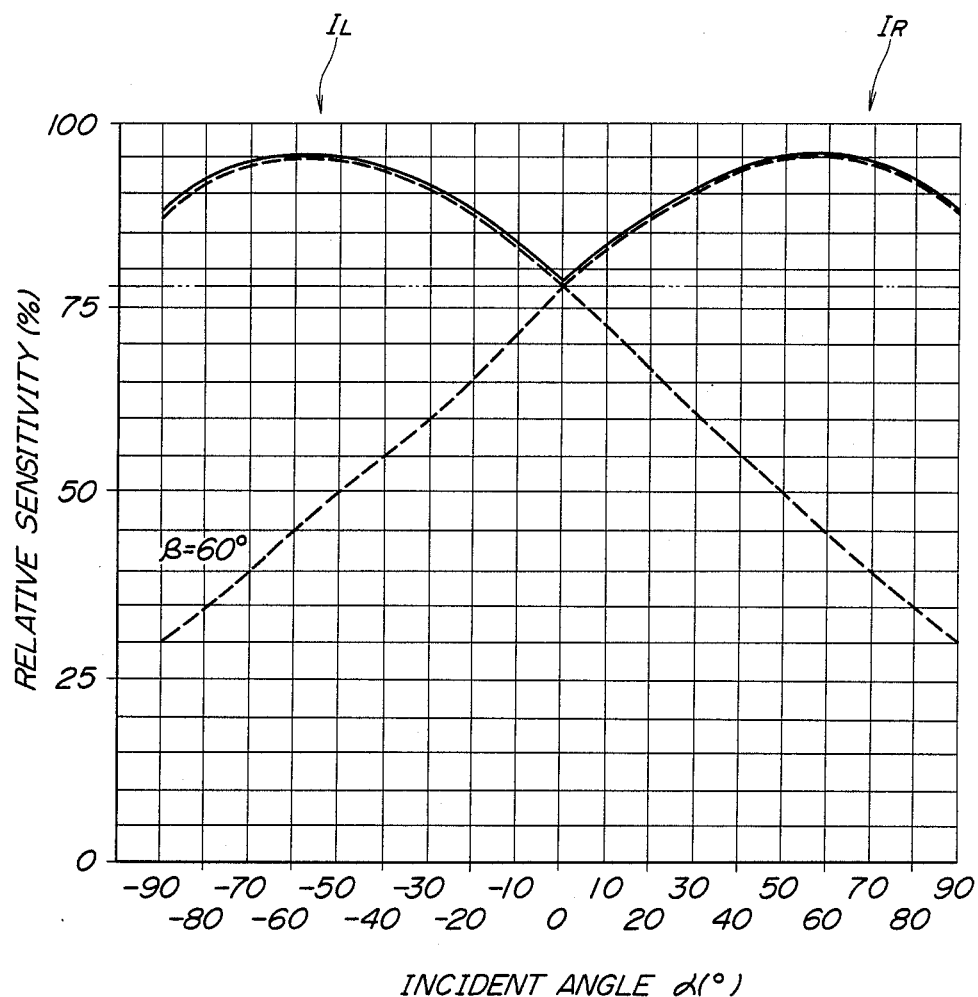
FIGS. 22 and 23 are characteristic diagrams showing the arithmetically corrected values in the prior art.
Figure 23:
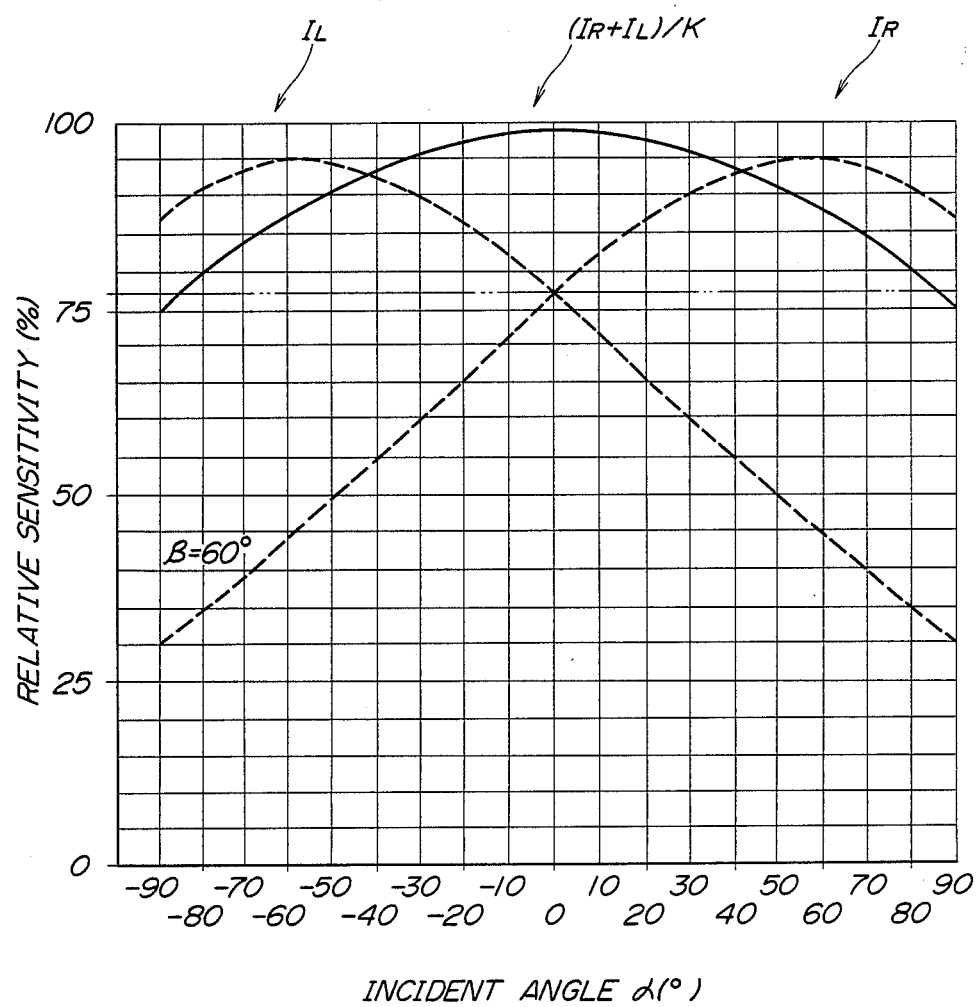

Other embodiments of said solar radiating direction calculating means will be considered. FIGS. 16 and 17 show a second embodiment, FIGS. 18 and 19 show a third embodiment, and FIGS. 20 and 21 show a fourth embodiment of the solar radiating direction calculating means.

In the second embodiment, as will be apparent from the subflow of FIG. 16, step $P_{1321}$ determines whether $I_R - I_L \geq 0$ or not and thereby determines whether the solar radiating direction is included within the right side or left side range of the car. It within the right side range, step $P_{1322}$ defines the calculated value of $K_6 \times \{(I_R - I_L)/(I_R + I_L)\}$ as the solar radiating direction and step $P_{1323}$ adjusts the door position $D_0$ leftwards in accordance with the solar radiating direction value $\alpha$ so that the air blast supplied from the right side nozzles 21R, 22R correspondingly increases. If step $P_{1321}$ determines that $I_R - I_L \geq 0$ is not established, step $P_{1324}$ concludes that the solar radiating direction is included within the left side range and defines, in the same manner as mentioned above with respect to the first embodiment, the calculated value of $K_6 \times \{(I_R - I_L)/(I_R + I_L)\}$ as the solar radiating direction $\alpha$ and step $P_{1325}$ adjusts the door position $D_0$ rightwards in accordance with the value of solar radiating direction so that the air blast amount supplied from the left side nozzles 21L, 22L correspondingly increases. Thus, the output signal corresponding to the solar radiating direction $\alpha$ is obtained as represented by solid lines in FIG. 17, and this embodiment is preferable for detection of the solar radiating direction when the sun height $\beta$ is relatively high. Broken lines in FIG. 17 represent actual measurements.

Figure 18:
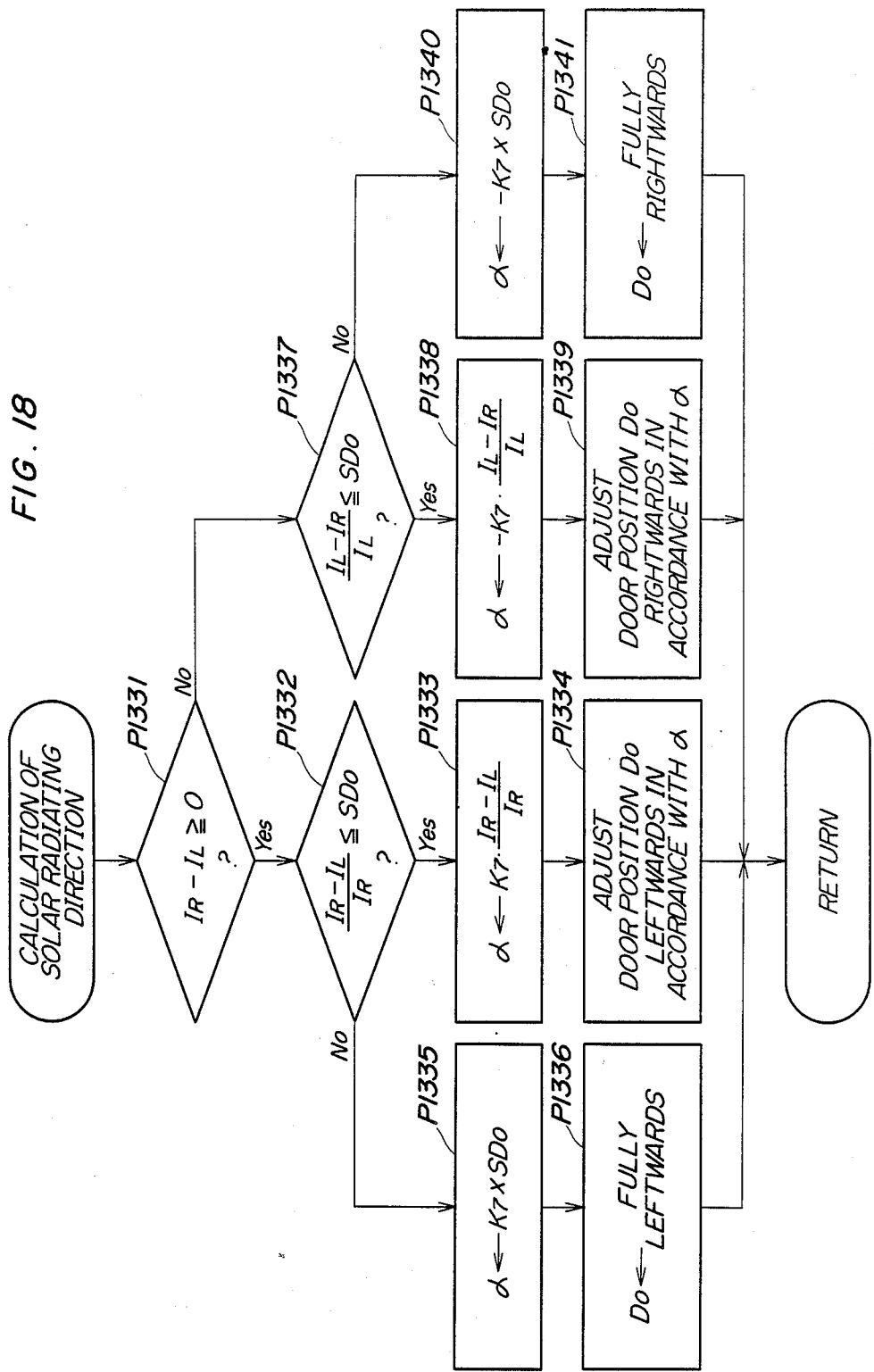

In the third embodiment, as shown by FIG. 18, step $P_{1331}$ determines whether $I_R - I_L \geq 0$ or not and, when the solar radiating direction is included within the right side range, determines whether $(I_R - I_L)/I_R \leq SD_0$ or not. If the solar radiating direction is included within the right side range, the output characteristic will be as indicated by the right side broken lines and the solar radiating direction output SD at each height $\beta$ within the right side range linearly increases as the solar radiating direction value increases. The solar radiating direction output SD becomes constant as the solar radiating direction approximates $\alpha_2$, $-\alpha_2$, and such constant value is defined as the standard value $SD_0$. If step $P_{1332}$ determines that $(I_R - I_L)/I_R \leq SD_0$, step $P_{1335}$ defines the calculated value of $K_7 \times (I_R - I_L)/I_R$ as a range of the solar radiating direction $\alpha$ within which the solar radiating direction output linearly changes and, if $(I_R - I_L)/I_R \leq SD_0$ is not established, step $P_{1333}$ defines the calculated value of $K_7 \times SD_0$ as a range of the solar radiating direction $\alpha$ within which the solar radiating direction output is constant. Over said range within which the solar radiating direction output SD linearly changes, step $P_{1334}$ adjusts the position $D_0$ of the blast distributing door 26 leftwards in accordance with the value of solar radiating direction $\alpha$ so that the air blast supplied from the right side nozzles 21R, 22R correspondingly increases. Over said range within which the solar radiating direction output SD is constant, the blast distributing door is adjusted fully leftwards so as to maximize the air blast supplied from the right side nozzles.

If step $P_{1331}$ determines that the solar radiating direction is included with in the left side range, step $P_{1337}$ determines whether $(I_R - I_L)/I_R \leq SD$ or not. Output characteristic of the solar radiating direction included within the left side range is plotted by left side broken lines in FIG. 19 and, just as at the right side, has a range within which the output linearly changes and a range within which the output is constant. If step $P_{1337}$ determines that $(I_L-I_R)/I_L \leq SD_0$ is established, step $P_{1338}$ defines the calculated value of $-K_7 \times (I_L-I_R)/I_L$ as the solar radiating direction and then step $P_{1339}$ adjusts the blast distributing door position $D_0$ according to said solar radiating direction $\alpha$ so that the air blast amount supplied from the left side nozzles 21L, 22L correspondingly increases. If $(I_L-I_R)/I_L \leq SD_0$ is not established, step $P_{1340}$ defines the calculated value of $-K_7 \times SD_0$ as a range of the solar radiating direction $\alpha$ within which the solar radiating direction output is constant and then step $P_{1341}$ adjusts the door position $D_0$ fully rightwards so as to maximize the air blast amount supplied from the left side nozzles. This embodiment is preferable not only for the case in which the sun is relatively high but also for the other various cases.

Finally, a fourth embodiment will be described. This embodiment performs processing substantially in the same manner as the third embodiment except that, as shown by FIG. 20, step $P_{1352}$ of the right side range defines $SD_0$ as the standard value while step $P_{1357}$ of the left side range defines $-SD_0$ as the standard value, so the solar radiating direction $\alpha$ exhibits a characteristic as shown by FIG. 21. Furthermore, this embodiment performs respective processes (steps $P_{1352}$, $P_{1353}$, $P_{1357}$, $P_{1358}$) on the basis of calculation of $(I_R-I_L)/(I_R+I_L)$. With a consequence, it is possible to improve the precision with which various devices such as the blast distributing door 26, the mixing door 18 and the blower 16 are controlled.

What is claimed:

1. Air conditioning apparatus for car comprising a solar radiation sensor having at least one right side light receiving element and at least one left side light receiving element, these light receiving elements being mounted on right and left sides of a car body with their light receiving surfaces being inclined towards the front of said car body, arithmetic solar radiation value correcting means adapted to, when the detection value output from said right side light receiving element is larger than the detection value output from the left side light receiving element, compares a value corresponding to a sum of said both detection values multiplied by a coefficient with the detection value of the right side light receiving element and then output the larger value of these both values as the arithmetically corrected solar radiation value, on one hand, and adapted to, when the detection value output from said right side light receiving element is smaller than the detection value output from said left side light receiving element, compare a value calculated in the same manner as mentioned above with the detection value output from the left side light receiving element and then output the larger value of these both values as the arithmetically corrected solar radiation value, on the other hand, and control means adapted to drive various air conditioning devices on the basis of the arithmetically corrected solar radiation value output from said arithmetic solar radiation value correcting means.

2. Air conditioning apparatus for car comprising a solar radiation sensor having at least one right side light receiving element and at least one left side light receiving element, these light receiving elements being mounted on right and left sides of a car body with their light receiving surfaces being inclined towards the front of said car body, solar radiating direction calculating means adapted to compare the detection value output from said right side light receiving element with the detection value output from said left side light receiving element so as to determine whether the solar radiating direction is predominant in right or left range of the car, solar radiation intensity calculating means adapted to, within a predetermined range of the solar radiating direction extending from the front to the right and left sides of the car body, output a value calculated on the basis of the solar radiating direction value from said solar radiating direction calculating means and the detection value from said right or left side light receiving element as the arithmetically corrected solar radiation intensity value, but, outside of said predetermined solar radiating direction range, output the detection value of said right or left side light receiving element as the arithmetically corrected solar radiation intensity value, and control means adapted to drive a blast distributing door to its optimal position on the basis of the output signal from said solar radiating direction calculating means to drive various air conditioning devices on the basis of the arithmetically corrected solar radiation intensity value from said solar radiation intensity calculating means.

* * * * *